United States Patent
Wang

(10) Patent No.: US 9,239,698 B2
(45) Date of Patent: Jan. 19, 2016

(54) DISPLAY DEVICE AND DISPLAY SYSTEM INCLUDING A PLURALITY OF DISPLAY DEVICES AND ELECTRONIC DEVICE USING SAME

(71) Applicant: HON HAI PRECISION INDUSTRY CO., LTD., New Taipei (TW)

(72) Inventor: Cho-Hao Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 64 days.

(21) Appl. No.: 14/055,793

(22) Filed: Oct. 16, 2013

(65) Prior Publication Data

US 2014/0184658 A1 Jul. 3, 2014

(30) Foreign Application Priority Data

Dec. 27, 2012 (TW) .............................. 101150529 A

(51) Int. Cl.
*G09G 5/10* (2006.01)
*G06F 3/14* (2006.01)

(52) U.S. Cl.
CPC ...... *G06F 3/1446* (2013.01); *G09G 2310/0264* (2013.01)

(58) Field of Classification Search
USPC ............ 345/690, 530, 2.1, 76, 503, 520, 204, 345/205, 2.2, 1.1, 1.3; 348/207.1
See application file for complete search history.

(56) References Cited

U.S. PATENT DOCUMENTS

| | | | |
|---|---|---|---|
| 2006/0164326 A1* | 7/2006 | Date ..................... | G06F 3/1446 345/1.3 |
| 2007/0035485 A1* | 2/2007 | Yoon ............................... | 345/76 |
| 2012/0256929 A1* | 10/2012 | Koenig .................. | H04L 12/00 345/503 |
| 2013/0038617 A1* | 2/2013 | Mody .................... | G06F 13/00 345/520 |
| 2013/0169603 A1* | 7/2013 | Bae ........................ | G09G 5/005 345/204 |
| 2013/0235051 A1* | 9/2013 | Kurita ................ | H04N 1/00137 345/520 |
| 2014/0043210 A1* | 2/2014 | Stein ..................... | G06F 9/4445 345/2.1 |
| 2015/0042824 A1* | 2/2015 | Kurita ................ | H04N 1/00137 348/207.1 |

OTHER PUBLICATIONS

Yao Yun et al., "A research on new measurement system for the grayscale response time of LCD", IEEE, 2007, pp. 904-907.*

* cited by examiner

*Primary Examiner* — Thuy Pardo
(74) *Attorney, Agent, or Firm* — Novak Druce Connolly Bove + Quigg LLP

(57) ABSTRACT

An exemplary display system includes a plurality of display devices spliced together, to increase a display size of the display system. Each of the display devices includes a screen, an image processing circuit, a first data interface, and a second data interface. The first data interface receives image signals from a signal source and outputs the image signals. The image processing circuit is connected to the first data interface, receives the image signals, converts the image signals into corresponding gray scale voltages, and outputs the gray scale voltages. The screen is connected to the image processing circuit, receives the gray scale voltages, and displays images based on the gray scale voltages. The second data interface is connected to the first data interface, receives the image signals from the first data interface, and outputs the image signals to another display device connected to the second data interface.

12 Claims, 3 Drawing Sheets

DISPLAY DEVICE AND DISPLAY SYSTEM INCLUDING A PLURALITY OF DISPLAY DEVICES AND ELECTRONIC DEVICE USING SAME

BACKGROUND

1. Technical Field

The present disclosure relates to display technology for electronic apparatuses, and more particularly, to a display system including a plurality of display devices capable of operating separately and an electronic device using the display system.

2. Description of Related Art

Electronic devices, such as televisions, or desktop computers, each employ a display device to display images. However, a size of the display device cannot be made large enough due to manufacturing limitations. Accordingly, when several users watch a display device together, one or more users may not be able to see the display due to influence factors, such as a narrow angle of view of the display device. As a result, it is uncomfortable for several viewers to view the display device together.

What is needed, therefore, is a means which can overcome the described limitations.

DETAILED DESCRIPTION

Reference will now be made to the drawings to describe specific exemplary embodiments of the present disclosure.

Figure 1:
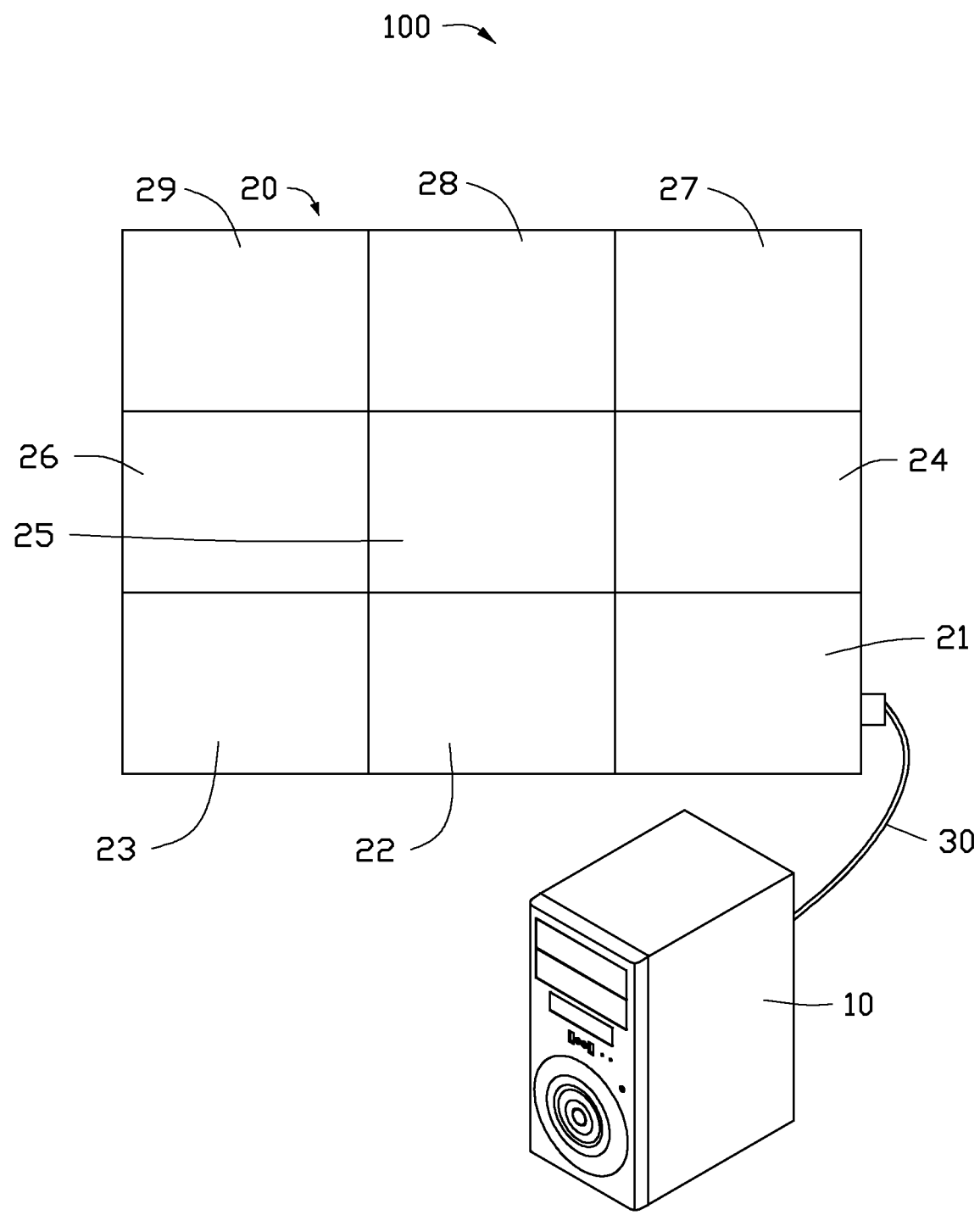
FIG. 1 is a schematic view illustrating one embodiment of an electronic device including a display system according to the present disclosure.
Figure 2:
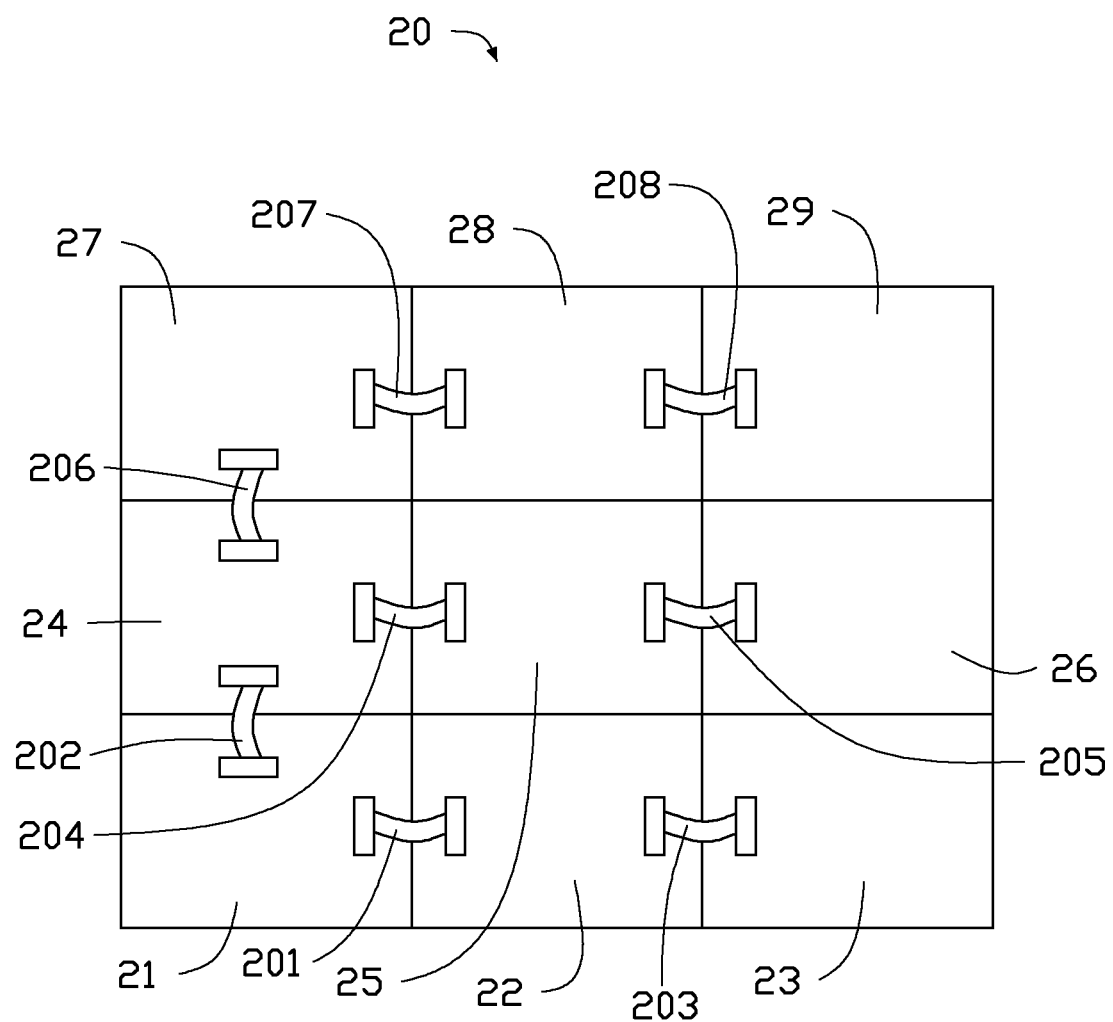
FIG. 2 is an isometric view of the display system of FIG. 1 viewed from another angle.

FIGS. 1-2 is an illustrated embodiment of an electronic device 100 according to the present disclosure. The electronic device 100 includes a signal source 10, a display system 20, and a first data line 30. The first data line 30 detachably interconnects the signal source 10 and the display system 20. The signal source 10 generates image signals, control signals, and first identification signals, and outputs the image signals, the control signals, and the first identification signals to the display system 20 via the first data line 30. The display system 20 displays images based on the image signals, the control signals, and the first identification signals. The first identification signals correspond to the control signals one by one. In the present embodiment, the signal source 10 may be a host computer, for example.

The display system 20 includes at least two display devices and at least one second data line to interconnect the at least two display devices. In the present embodiment, the display system 20 includes a first display device 21, a second display device 22, a third display device 23, a fourth display device 24, a fifth display device 25, a sixth display device 26, a seventh display device 27, an eighth display device 28, a ninth display device 29, and a plurality of second data lines 201, 202, 203, 204, 205, 206, 207, 208 (shown in FIG. 2). The first, second, third, fourth, fifth, sixth, seventh, eighth, ninth display devices 21, 22, 23, 24, 25, 26, 27, 28, 29 are spliced together via the second data interfaces 201, 202, 203, 204, 205, 206, 207, 208, so as to increase a display size of the display system 20. The first, second, third, fourth, fifth, sixth, seventh, eighth, ninth display devices 21, 22, 23, 24, 25, 26, 27, 28, 29 each are capable of operating separately, and may have a touch function.

The first display device 21 is connected to the signal source 10 via the first data line 30, connected to the second display device 22 via the second data line 201, and connected to the fourth display device 24 via the second data line 202. The second display device 22 is further connected to the third display device 23 via the second data line 203. The fourth display device 24 is further connected to the fifth display device 25 via the second data line 204, and connected to the seventh display device 27 via the second data line 206. The fifth display device 25 is further connected to the sixth display device 26 via the second data line 205. The eighth display device 28 is connected to the seventh display device 27 via the second data line 207, and connected to the ninth display device 29 via the second data line 208.

Figure 3:
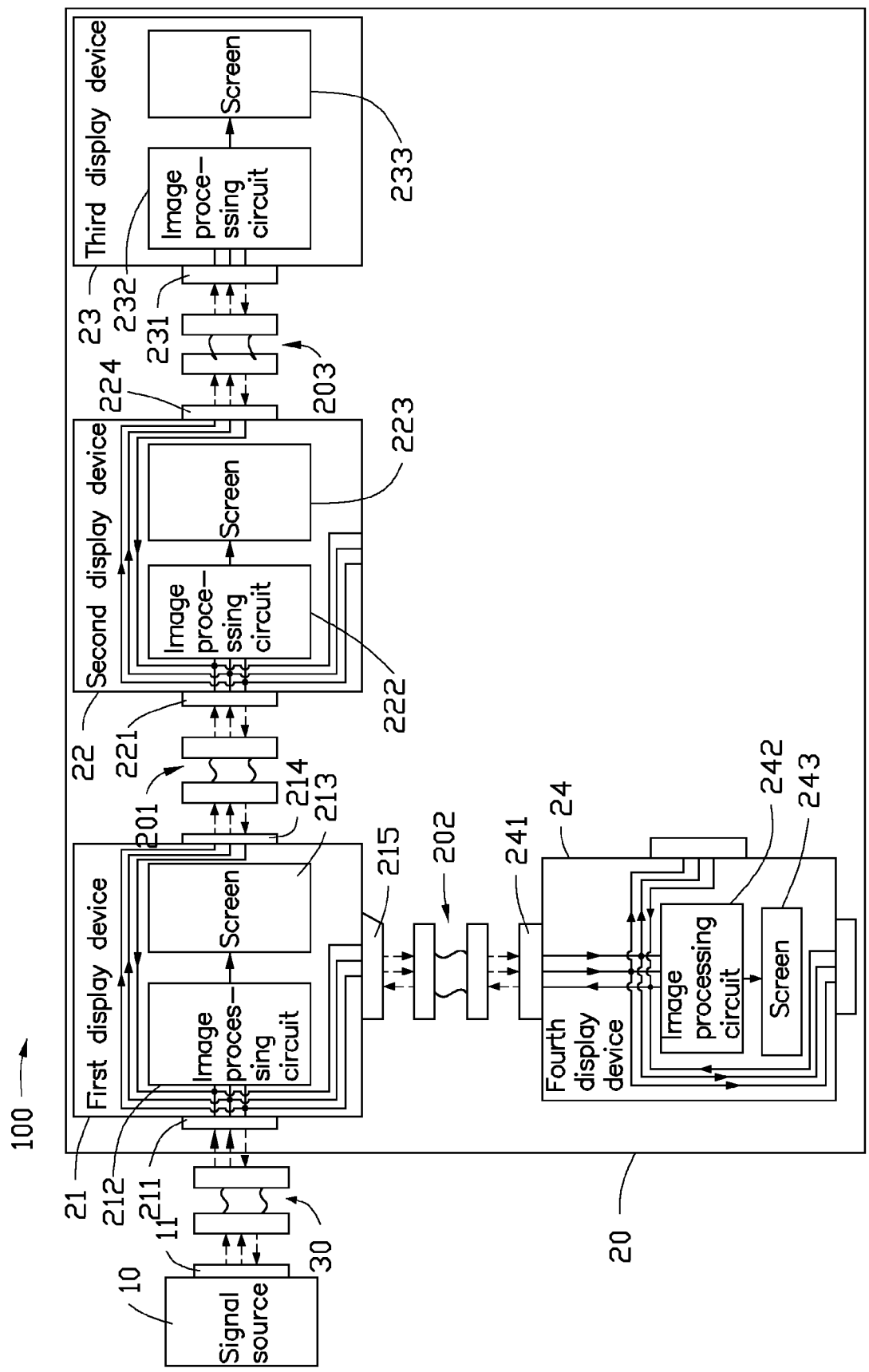
FIG. 3 is a partial, schematic block view of the electronic device of FIG. 1.

To clearly express electrical connections between electronic components in FIG. 3, broken lines are used to designate plug connections between interfaces of the first, second, third, fourth display devices 21, 22, 23, 24 and interfaces of the first, second data lines 30, 201, 202, 203, and solid lines are used to designate electrical connections between other electronic components in FIG. 3. The first, second, third, and fourth display devices 21, 22, 23, 24 are described as an example to clearly illustrate the electronic device 100. Connection relations and operations of other display devices are similar to the first, second, third, and fourth display devices 21, 22, 23, 24. Accordingly, the connection relations and the operations of other display devices are not described in detail hereinafter. The signal source 10 includes a data interface 11. The data interface 11 is connected to the first display device 21 via the first data line 30.

The first display device 21 includes a first data interface 211, an image processing circuit 212, a screen 213, a second data interface 214, and a third data interface 215. The first data interface 211 is connected to the data interface 11 of the signal source 10 via the first data line 30, and further connected to the image processing circuit 212, the second data interface 214, and the third data interface 215. The image processing circuit 212 is further connected to the screen 213.

The second display device 22 includes a first data interface 221, an image processing circuit 222, a screen 223, and a second data interface 224. The first data interface 221 is connected to the second data interface 214 via the second data line 201. The first data interface 221 is further connected to the second data interface 224 and the image processing circuit 222. The image processing circuit 22 is further connected to the screen 223.

The third display device 23 includes a first data interface 231, an image processing circuit 232, and a screen 233. The first data interface 231 is connected to the second data interface 224 via the second data line 203, and further connected to the image processing circuit 232. The image processing circuit 232 is further connected to the screen 233.

The fourth display device 24 includes a first data interface 241, an image processing circuit 242, and a screen 243. The first data interface 241 is connected to the third data interface 215 via the second data line 202, and further connected to the image processing circuit 242. The image processing circuit 242 is further connected to the screen 243.

The first data interfaces 211, 221, 231, 241, the second data interfaces 214, 224, and the third data interface 214 each may be a video graphics array (VGA) interface, or a digital visual interface (DVI), for example.

The image processing circuits 212, 222, 232, and 242 each store a second identification signal. The second identification signals stored in the image processing circuits 212, 222, 232, and 242 are different from one another. The second identification signals represent positions of the first, second, third, and fourth display devices 21, 22, 23, and 24 arrayed in the display system 20. The positions of the first, second, third, and fourth display devices 21, 22, 23, and 24 are different from one another.

The first identification signals represent the positions of the first, second, third, and fourth display devices 21, 22, 23, and 24 arrayed in the display system 20. Each of the first identification signals is identical with a corresponding one of the second identification signals.

The control signals control the first, second, third, and fourth display devices 21, 22, 23, and 24 each to separately display every image or cooperatively display every image according to selections of a user. The first, second, third, and fourth display devices 21, 22, 23, and 24 each display part of every image when the first, second, third, and fourth display devices 21, 22, 23, and 24 cooperatively display every image. The first, second, third, and fourth display devices 21, 22, 23, and 24 each display the whole of every image when the first, second, third, and fourth display devices 21, 22, 23, and 24 separately display every image. The control signals that control the first, second, third, and fourth display devices 21, 22, 23, and 24 to separately display every image are identical with one another. The control signals that control the first, second, third, and fourth display devices 21, 22, 23, and 24 to cooperatively display every image are different from one another.

Each of the image processing circuits 212, 222, 232, and 242 receives the image signals, the first identification signals, and the control signals from the signal source 10, finds a first identification signal that is the same as the stored second identification signal and a control signal corresponding to the first identification signal, converts the image signals into corresponding gray scale voltages, and selectively outputs part of the gray scale voltages or the whole of the gray scale voltages to a corresponding one of the screen 213, 223, 233, and 243, based on the found control signal.

Operation of the electronic device 100 is as follows.

When the electronic device 100 is in an initialization state, the signal source 10 identifies the first, second, third, and fourth display devices 21, 22, 23, and 24 via the image processing circuits 212, 222, 232, and 242, determines the positions of the first, second, third, and fourth display devices 21, 22, 23, 24 arrayed in the display system 20. Information about the positions of the first, second, third, and fourth display devices 21, 22, 23, 24 may be set by the user, for example. The signal source 10 receives the information and determines the positions of the first, second, third, and fourth display devices 21, 22, 23, 24. The signal source 10 further generates identification signals representing the positions of the first, second, third, and fourth display devices 21, 22, 23, and 24, and outputs the generated identification signals to the image processing circuits 212, 222, 232, 242. Each of the image processing circuits 212, 222, 232, 242 stores a received identification signal. The identification signals correspondingly stored in the image processing circuits 212, 222, 232, 242 are defined as the second identification signals. In contrast, the identification signals output from the signal source 10 when the electronic device 100 enters in an operation state from the initialization state are defined as the first identification signals.

When the electronic device 100 is operating, the signal source 10 generates the control signals corresponding to the first identification signal, according to a selection of the user. When the user selects the first, second, third, and fourth display devices 21, 22, 23, 24 to separately display every image, the signal source 10 generates identical control signals, so as to control the first, second, third, and fourth display devices 21, 22, 23, 24 to display identical images. When the user selects the first, second, third, and fourth display devices 21, 22, 23, 24 to cooperatively display every image, the signal source 10 generates different control signals, so as to control the first, second, third, and fourth display devices 21, 22, 23, 24 each to display part of every image.

The signal source 10 outputs the image signals, the first identification signals, and the control signals to the first, second, third, and fourth display devices 21, 22, 23, 24. Each of the image processing circuits 212, 222, 232, and 242 receives the image signals, the first identification signals, and the control signals from the signal source 10, finds a first identification signal that is the same as the stored second identification signal and a control signal corresponding to the first identification signal, converts the image signals into corresponding gray scale voltages, and outputs part of the gray scale voltages or the whole of the gray scale voltages to a corresponding one of the screen 213, 223, 233, 243, based on the found control signal. The screens 213, 223, 233, 243 each display images based on the received gray scale voltages.

Since the electronic device 100 includes the display system 20 spliced by the first, second, third, and fourth display devices 21, 22, 23, 24, a display size of the electronic device 100 is increased. Accordingly, a display effect of the display system 20 can be improved when several users watch the display system 20 together.

In alternative embodiments, when the first, second, third, and fourth display devices 21, 22, 23, 24 of the display system 20 cooperatively display every image, two or more neighboring display devices may display identical images.

The number of data interfaces of each of the first, second, third, and fourth display devices 21, 22, 23, 24 may be identical, for example.

It is believed that the present embodiments and their advantages will be understood from the foregoing description, and it will be apparent that various changes may be made thereto without departing from the spirit and scope of the present disclosure or sacrificing all of its material advantages, the examples hereinbefore described merely being preferred or exemplary embodiments.

What is claimed is:

1. A display device, comprising:
a first data interface receiving image signals from a signal source and outputting the image signals;
an image processing circuit connected to the first data interface, receiving the image signals, converting the image signals into corresponding gray scale voltages, and outputting the gray scale voltages;
a screen connected to the image processing circuit, receiving the gray scale voltages, and displaying images based on the gray scale voltages; and
a second data interface connected to the first data interface, receiving the image signals from the first data interface, and outputting the image signals to a second display device connected to the second data interface;
wherein the first data interface further receives control signals from the signal source and outputs the control signals to the image processing circuit; the image processing circuit selectively outputs part of the gray scale voltages of every image or the whole of the gray scale voltages of every image to the screen, based on one of the control signals.

2. The display device of claim 1, wherein the image processing circuit further stores a first identification signal; the first data interface further receives a plurality of second identification signals from the signal source and outputs the second identification signals; the second identification signals correspond to the control signals one by one; the image processing circuit receives the second identification signals, finds a second identification signal that is the same as the stored first identification signal and a control signal corresponding to the second identification signal, and selectively outputs part of the gray scale voltages of every image or the whole of the gray scale voltages of every image to the screen, based on the found control signal.

3. The display device of claim 2, wherein the second data interface further receives the second identification signals and the control signals corresponding to the second identification signals, and outputs the second identification signals and the control signals to the second display device connected to the second data interface.

4. A display system, comprising:
a first display device comprising:
a first data interface receiving image signals from a signal source and outputting the image signals;
an image processing circuit connected to the first data interface, receiving the image signals, converting the image signals into corresponding gray scale voltages, and outputting the gray scale voltages;
a screen connected to the image processing circuit, receiving the gray scale voltages, and displaying images based on the gray scale voltages; and
a second data interface connected to the first data interface, receiving the image signals from the first data interface, and outputting the image signals; and
a second display device comprising:
a first data interface connected to the second interface of the first display device, receiving the image signals from the second interface of the first display device, and outputting the image signals;
an image processing circuit connected to the first data interface of the second display device, receiving, the image signals from the first data interface of the second display device, converting the image signals into corresponding gray scale voltages, and outputting the gray scale voltages; and
a screen connected to the image processing circuit of the second display device, receiving the gray scale voltages from the image processing circuit of the second display device, and displaying images based on the received gray scale voltages;
wherein the second display device further comprises a second data interface connected to the first data interface of the second display device, the second data interface receives the image signals from the first data interface of the second display device, and outputs the receives image signals to another display device connected to the second data interface of the second display device;
wherein the first data interface of the first display device further receives control signals from the signal source and outputs the control signals to the image processing circuit of the first display device; the image processing circuit of the first display device selectively outputs part of the gray scale voltages of every image or the whole of the gray scale voltages of every image to the screen of the first display device, based on one of the control signals.

5. The display system of claim 4, wherein the first data interface of the second display device further receives the control signals via the second data interface of the first display device, the image processing circuit of the second display device selectively outputs part of the gray scale voltages of every image or the whole of the gray scale voltages of every image to the screen of the second display device, based on one of the control signals.

6. The display system of claim 5, wherein the image processing circuit of the first display device further stores a first identification signal; the first data interface of the first display device further receives a plurality of second identification signals from the signal source and outputs the second identification signals; the second identification signals correspond to the control signals one by one; the image processing circuit of the first display device receives the second identification signals, finds a second identification signal that is the same as the first identification signal stored in the image processing circuit of the first display device and a control signal corresponding to the second identification signal, and selectively outputs part of the gray scale voltages of every image or the whole of the gray scale voltages of every image to the screen, based on the found control signal.

7. The display system of claim 6, wherein the image processing circuit of the second display device further stores a first identification signal different from the first identification signal stored in the image processing circuit of the first display device; the first data interface of the second display device further receives the second identification signals from the first data interface of the first display device via the second data interface of the first display device, and outputs the second identification signals; the image processing circuit of the second display device receives the second identification signals, finds a second identification signal that is the same as the first identification signal stored in the image processing circuit of the second display device and a control signal corresponding to the second identification signal, and selectively outputs part of the gray scale voltages of every image or the whole of the gray scale voltages of every image to the screen, based on the control signal found by the image processing circuit of the second display device.

8. The display system of claim 7, wherein the second data interface of the second display device further receives the second identification signals and the control signals from the first data interface of the second display device, and outputs the second identification signals and the control signals to another display device connected to the second data interface of the second display device.

9. An electronic device, comprising:
a signal source providing image signals;
a first display devices comprising:
a first data interface receiving the image signals from the signal source and outputting the image signals;
an image processing circuit connected to the first data interface, receiving the image signals, converting the image signals into corresponding gray scale voltages, and outputting the gray scale voltages;
a screen connected to the image processing circuit, receiving the gray scale voltages, and displaying images based on the gray scale voltages; and
a second data interface connected to the first data interface, receiving the image signals from the first data interface, and outputting the image signals; and
a second display device comprising:
a first data interface connected to the second interface of the first display device, receiving the image signals from the second interface of the first display device, and outputting the image signals;

an image processing circuit connected to the first data interface of the second display device, receiving the image signals from the first data interface of the second display device, converting the image signals into corresponding gray scale voltages, and outputting the gray scale voltages; and a screen connected to the image processing circuit of the second display device, receiving the gray scale voltages from the image processing circuit of the second display device, and displaying images based on the received gray scale voltages;

wherein the second display device further comprises a second data interface connected to the first data interface of the second display device, the second data interface receives the image signals from the first data interface of the second display device, and outputs the receives image signals to another display device connected to the second data interface of the second display device; and wherein the signal source further provides control signals; the first data interface of the first display device further receives the control signals from the signal source and outputs the control signals to the image processing circuit of the first display device; the image processing circuit of the first display device selectively outputs parts of the gray scale voltages of every image or the whole of the gray scale voltages of every image to the screen of the first display device, based on one of the control signals.

10. The electronic device of claim 9, wherein the first data interface of the second display device further receives the control signals via the second data interface of the first display device, the image processing circuit of the second display device selectively outputs part of the gray scale voltages of every image or the whole of the gray scale voltages of every image to the screen of the second display device, based on one of the control signals.

11. The electronic device of claim 10, wherein the image processing circuit of the first display device further stores a first identification signal; the signal source further provides a plurality of second identification signals; the first data interface of the first display device further receives the second identification signals from the signal source and outputs the second identification signals; the second identification signals correspond to the control signals one by one; the image processing circuit of the first display device receives the second identification signals, finds a second identification signal that is the same as the first identification signal stored in the image processing circuit of the first display device and a control signal corresponding to the second identification signal, and selectively outputs part of the gray scale voltages of every image or the whole of the gray scale voltages of every image to the screen, based on the found control signal.

12. The electronic device of claim 11, wherein the image processing circuit of the second display device further stores a first identification signal different from the first identification signal stored in the image processing circuit of the first display device; the first data interface of the second display device further receives the second identification signals from the first data interface of the first display device via the second data interface of the first display device, and outputs the second identification signals; the image processing circuit of the second display device receives the second identification signals, finds a second identification signal that is the same as the first identification signal stored in the image processing circuit of the second display device and a control signal corresponding to the second identification signal, and selectively outputs part of the gray scale voltages of every image or the whole of the gray scale voltages of every image to the screen, based on the control signal found by the image processing circuit of the second display device.

* * * * *